United States Patent [19]
Sirat

[11] Patent Number: 5,517,598
[45] Date of Patent: May 14, 1996

[54] ERROR BACK-PROPAGATION METHOD AND NEURAL NETWORK SYSTEM

[75] Inventor: Jacques A. Sirat, Limeil-Brevannes, France

[73] Assignee: U.S. Philips Corporation, New York, N.Y.

[21] Appl. No.: 275,911

[22] Filed: Jan. 28, 1993

Related U.S. Application Data

[63] Continuation of Ser. No. 767,348, Sep. 27, 1991, abandoned, which is a continuation of Ser. No. 441,141, Nov. 22, 1989, abandoned.

[30] Foreign Application Priority Data

Nov. 25, 1988 [FR] France .................................. 88 15428

[51] Int. Cl.$^6$ ............................ G06F 15/18; G06F 15/31; G06K 9/62
[52] U.S. Cl. .............................................. 395/27; 364/736
[58] Field of Search ................................................ 395/27

[56] References Cited

U.S. PATENT DOCUMENTS

| | | | |
|---|---|---|---|
| 4,727,505 | 2/1988 | Konishi et al. .......................... | 364/728 |
| 4,941,122 | 7/1990 | Werdeman .............................. | 364/807 |
| 4,994,982 | 2/1991 | Duranton et al. ....................... | 364/513 |

OTHER PUBLICATIONS

S. C. J. Garth, "A Chipset for High Speed Simulation of Neural Network Systems", 1987 IEEE Conf. on Neural Networks, 1987, III–443–III–452.

De Gloria, A., "The VLSI Technology and the Design of Neural Networks", First Italian Workshop Parallel. Architechtures and Neural Networks, Apr. 1988, pp. 119–127.

Duranton et al., "A General Purpose Digital Architecture for Neural Network Simulations", from First IEEE. Intl. Conf. on Artificial Neural Networks, Oct. 1989, pp. 62–66.

Pacheco et al., "A Simple VLSI Architecture for Neurocomputing", Neural Networks, vol. 1 Subl, 1988, p. 398.

Paulos et al., "A VLSI Architecture for Feedforward Networks with Integral Back–Propagation," Neural Networks No. 1 Sup. 1, 1988, 399.

Lippmann, R. P., "An Introduction to Computing with Neural Nets", IEEE ASSP Mag., Apr. 7, '87, pp. 4–22.

Stone, H. S., High–Performance Computer Architecture, 1987, pp. 127–132, 233–266, 299–303.

Hamacher, C. V. et al., Computer Organization Sec. Ed., 1984, p. 305.

*Primary Examiner*—Robert W. Downs
*Attorney, Agent, or Firm*—Anne E. Barschall

[57] ABSTRACT

Method and apparatus of error back-propagation for use in a neural network system. A first group (11) of processing devices ($13_1$, $13_2$, $13_3$) performs the resolving steps and a second group (12) of analogous processing devices ($13_4$, $13_5$) performs the training steps while backpropagating errors calculated in a central processing device (10). The synaptic coefficient matrix $C_{ij}$ of the first group and the transposed matrix $T_{ji}$ of the second group are simultaneously updated. This updating of the synaptic coefficients can be performed by means of multipliers ($34_1$ to $34_N$) and adders ($37_1$ to $37_N$).

21 Claims, 3 Drawing Sheets

FIG. 2A

$k=4$ $\sum_j C^2_{3j} \cdot V^2_j \quad \Delta^3_3 = \eta \cdot \delta^3_3$ $i = 1 \quad 2 \quad 3 \quad 4 \quad 5 \qquad k=3$ $C^2_{31} \quad C^2_{32} \quad C^2_{33} \quad C^2_{34}$ $j = 1 \quad 2 \quad 3 \quad 4 \qquad k=2$ $V^2_1 \quad V^2_2 \quad V^2_3 \quad V^2_4$ $k=1$

FIG. 2B

$\delta^4_1 \quad \delta^4_2 \quad \delta^4_3$ $i = 1 \quad 2 \quad 3 \qquad k=4$ $T^3_{21} \quad T^3_{22} \quad T^3_{23}$ $j = 1 \quad 2 \quad 3 \quad 4 \quad 5 \qquad k=3$ $\sum_i T^3_{2i} \cdot \delta^4_i \quad D^3_2 = \eta \cdot V^3_2 \qquad k=2$ $k=1$

ERROR BACK-PROPAGATION METHOD AND NEURAL NETWORK SYSTEM

This is a continuation of application Ser. No. 07/767,348, filed on Sep. 27, 1991, now abandoned, which is a continuation of Ser. No. 07/411,141, filed Nov. 22, 1989, now abandoned.

BACKGROUND OF THE INVENTION

The invention relates to a processing method for using an error back-propagation algorithm in a layered neural network device, and to the network system device architecture for implementing the method itself.

The invention is used for solving problems relating to classification, pattern recognition, character recognition, speech signal processing, image processing, data compression etc.

Neurons are non-linear elementary active elements which are interconnected in a very dense network. Two types of network are considered:
- fully connected networks which are referred to as Hopfield networks,
- layered networks in which the neurons are grouped in successive layers, each neuron being connected to all neurons of the next layer, the information passing from the input layer to the next layers (hidden layers) until it reaches the output layer.

These systems are capable of being trained by examples or of organising themselves. The very long calculation times in a sequential computer can be substantially reduced by performing the operations involved in the training or resolving process in parallel.

The training algorithms can be subdivided into two categories:
- local training where the modification of a synaptic coefficient $C_{ij}$ linking the input neuron i to the output neuron j depends only on the information in the neurons i and j,
- non-local training where it depends on information present throughout the network. The latter training method uses, for example, the error back-propagation algorithm in a layered neural network architecture; this is the subject of the present invention.

A method and a network of this kind are known from the document "A VLSI Architecture for feedforward networks with integral back-propagation" J. J. Paulos and P. W. Hollis, Neural Networks, No. 1, supplement 1, p. 399, 1988. This is an analog/digital circuit which comprises two sub-networks, the resolving step being performed in the first sub-network while the back-propagation step takes place in the second sub-network. It also comprises a calculation unit (ALU) for the updating of coefficients. The updating of coefficients takes place sequentially.

Thus, the problem faced by the invention is to increase the processing speed of such a network apparatus while limiting data transport.

SUMMARY OF THE INVENTION

The resolving process will consist of the determination of the states of i output neurons on the basis of j input neurons along a path extending through K successive layers with forward propagation. Thus, the neuron j of the layer k (k between 1 and K) transmits its state $V_j^k$ to the neuron i of the layer k+1, weighted by the synaptic coefficient $C_{ij}^k$ in accordance with the expression $$V_i^{k+1} = f\left( \sum_{j=1}^{N} C_{ij}^k \cdot V_j^k \right) (N = N_k)$$

where f is a generally non-linear function.

The training process will consist of the determination of an error $\delta_i^k$ between the resolving processing output states obtained and the desired output states and of making this error propagate in the reverse direction of the resolving process. To this end, an example to be learned is presented to the input of the network, after which a resolving step is performed. On the last layer K the output obtained $\{V_i^K\}_i$ is compared with the desired output $\{V_i^{-k}\}_i$ in order to calculate the error $$\delta_i^k = f_1[f^{-1}(V_i^k)] \cdot (V_i^{-k} - V_i^k)$$

where $f^{-1}$ is the inverse and $f_1$ is the derivative of the non linear function. This error is subsequently backpropagated from one layer to the preceding layer, in the training process apparatus, in accordance with the expression:

$$\delta_j^{k-1} = f_1[f^{-1}(V_j^{k-1})] \cdot \sum_{i=1}^{N} (T_{ji}^{k-1} \cdot \delta_i^k)(N = N_{k-1})$$

wherein $T^{k-1}$ indicates the transposed matrix associated with the synaptic coefficient matrix $C^{k-1}$.

This error back-propagation apparatus resembles the resolving process apparatus for determining the neuron states during the resolving step.

The updating process will consist of taking into account the results obtained after the back-propagation of the error and of redefining the new synaptic coefficients for a complete new cycle of these three processes.

The coefficients are updated according to the learning rule:

$$C_{ij}^k \text{ (new)} = C_{ij}^k \text{ (old)} + \eta \cdot \delta_i^{k+1} \cdot V_j^k$$

and $$T_{ji}^k \text{ (new)} = T_{ji}^k \text{ (old)} + \eta \cdot \delta_i^{k+1} \cdot V_j^k$$

where $\eta$ is a gain factor (scale factor). These steps are local steps performed in each processor and propagate the information forwards (resolving) or backwards (error back-propagation), the updating of the coefficients utilises upstream as well as downstream information (regardless of the propagation direction). Thus, the various steps can be executed in parallel (from the layer k to the layer k+1 or in the reverse direction). This takes place in accordance with the invention by utilising identical processors which enable parallel execution on the inputs (index j) as well as on the outputs (i) by loading the transposed matrix into the training processors processors. This parallel processing enables uniform execution of the updating step for the two propagation directions. It suffices to take $$\Delta_i^{k+1} = \eta \cdot \delta_i^{k+1} \text{ and } D_j^k = \eta \cdot V_j^k$$

These processing steps may, for instance, be distributed between the two groups of processors, i.e. resolving and training and the automatic processing device which is, for example a host computer. For a neural network device organised in K successive layers of neurons, the resolving apparatus comprises K-1 processors and the training apparatus comprises K-2 processors which are identical in structure to the resolving processors but are used with different information.

The various processing steps performed by each group of processing apparatus may be interleaved as follows:

in the first resolving apparatus: initialisation of the synaptic coefficients $C_{ij}$ in the synaptic coefficient memories of the entire group of resolving processors, in the training apparatus: initialisation of the transposed matrix $T_{ji}$ of the matrix $C_{ij}$ in the synaptic coefficient memories of the entire group of training processors.

The initialisation steps are performed once at the start of use of the neural network.

In the resolving apparatus:
initialisation of the states of the j input neurons $V_j^k$ in the state memory of the first resolving processor, in the resolving apparatus:
determination for each layer of the state of each output neuron i on the basis of the states of the input neurons j, the states of the output neurons of a processing layer becoming the states of the input neurons of the next processing layer, in the host computer:
comparison of the state obtained and the desired state for each output neuron i of the last layer and determination of the error $\delta_i$ between these two states, in the training apparatus:
introduction of the errors $\delta_i$ in the state of the first training processor, in the training apparatus:
back-propagation of the error, proceeding from the output states of the last preceding layer to the input states of the next layer while performing in each processing layer the determination of the state of each output error j on the basis of the states of the input errors i, and multiplication in the host computer of this output state by the value assumed by the function derived from the non-linear inverse function at the point $V_j$, being the state of the input neuron j of the corresponding processing layer of the resolving apparatus, in the host computer:
determination, on the basis of the new error values contained in the state memory of the first resolving processor, of increments $\Delta_i^{k+1}$ and $D_j^k$ to be simultaneously applied to the synaptic coefficients $C_{ij}$ and $T_{ij}$, in the resolving apparatus:
updating of the synaptic coefficients $C_{ij}$ so that:

$$C_{ij}^k \text{ (new)} = C_{ij}^k \text{ (old)} + \Delta_i^{k+1} \cdot V_j^k$$

in the training apparatus:
updating the synaptic coefficients $T_{ji}$ simultaneously with the preceding updating operation so that $$T_{ji}^k \text{ (new)} = T_{ji}^k \text{ (old)} + D_j^k \cdot \delta_i^{k+1}.$$

Given the fact that the updating step takes place simultaneously for a block in the resolving and training processes and that the initialisation and the incrementation of $C_{ij}^k$ and $T_{ji}^k$ are identical, it is ensured that in each resolving or back-propagation iteration the two sub-assemblies utilise the same synaptic coefficients. This is also valid if the values of $C_{ij}^k$ and $T_{ji}^k$ are limited, provided that the rule at the limits (saturation, modulo or reflection) is the same for the two processes.

The above exemplary updating of the synaptic coefficients uses the method of steepest descent (gradient descent). It will be clear to one skilled in the art that the related learning rules involving a gradient descent part, such as the momentum learning rule, may fruitfully be employed in a method and network device according to the invention.

BRIEF DESCRIPTION OF THE FIGURES

The invention will be described in detail hereinafter with reference to the accompanying drawings. Therein:

FIGS. 2A, 2B show two diagrams illustrating the execution of the calculations during the resolving process and the training process, respectively.

DETAILED DESCRIPTION OF THE PREFERRED EMBODIMENT

Figure 1:
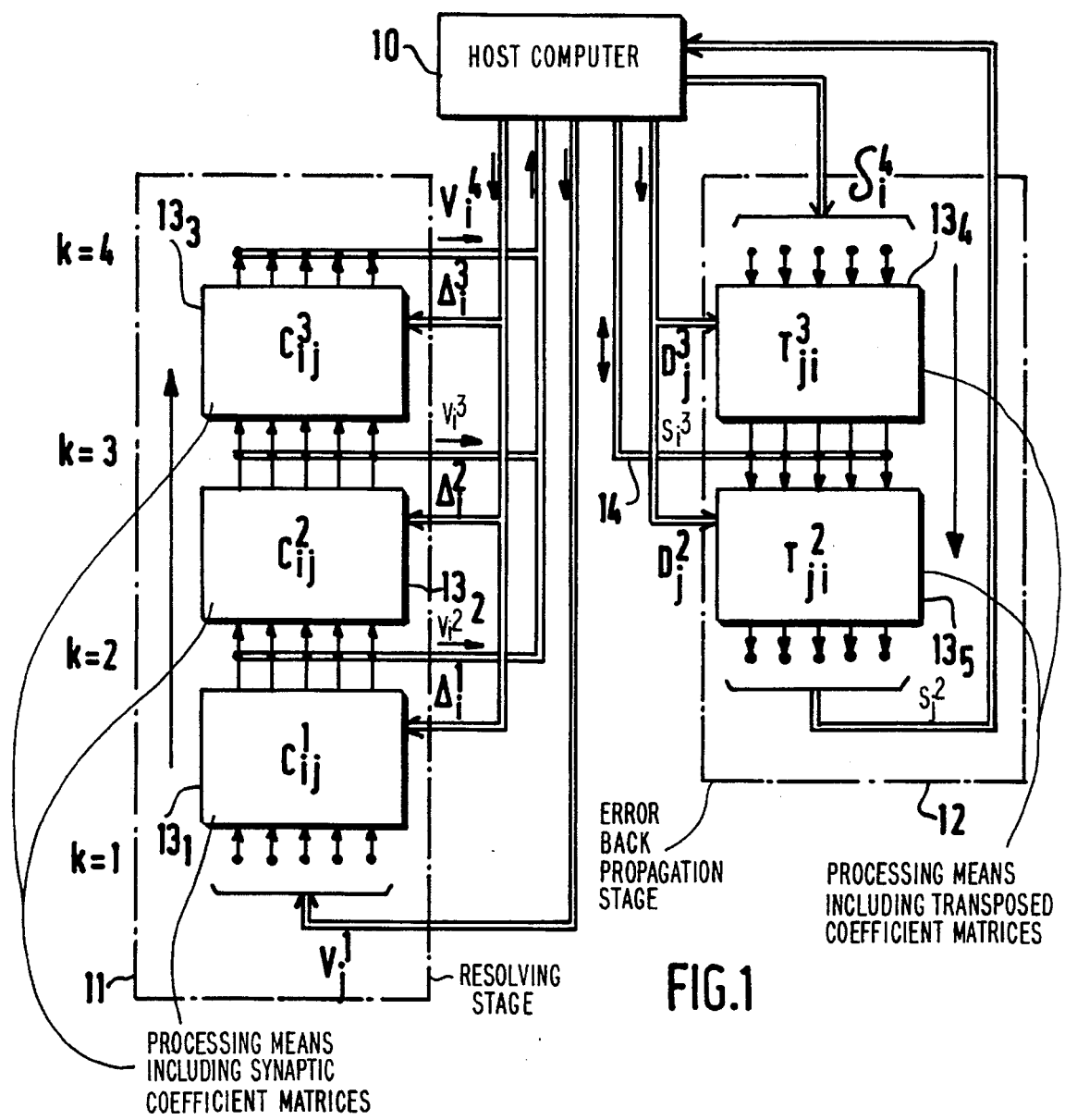
FIG. 1 shows a general diagram of a neural network device utilising the processing in accordance with the invention.

FIG. 1 shows a neural network device which comprises two processing apparatus groups 11, 12 and a host computer 10. The apparatus group 11 performs the resolving process and the second processing apparatus group 12 performs the error backpropagation method. The apparatus group 11 comprises the processors $13_1$, $13_2$, $13_3$ which are cascaded between K=4 layers neurons (k=1, 2, 3, 4). These processors store the respective Synaptic coefficient matrices.

$$C_{ij}^1, C_{ij}^2, C_{ij}^3$$

The apparatus group 12 comprises processors $13_4$, $13_5$ which are cascaded and which operate between the layers k=4, k=3 and k=2. They store the respective synaptic coefficient matrices $T_{ji}^3$ and $T_{ji}^2$, each matrix T being the transposed matrix of its associated matrix C.

For example from the host computer the group 11 receives the input states $V_j^1$ which are introduced at the first layer into the first resolving processor $13_1$, the output states of the first processor $13_1$ being supplied to the input of the second processor $13_2$. During the first resolving iteration, calculated states $V_i^k$ which are supplied by the host computer 10 appear at the output of the three processors $13_1$, $13_2$, $13_3$. Host computer 10 compares the states $V_i^4$ obtained at the output of the last processor $13_3$ with the desired output states associated with the states presented to the input. The difference detected appears as an error $\delta_i^4$ which is proper to each output neuron i of the layer 4. The host computer 10 introduces this error $\delta_i^4$ into the training phase processor $13_4$ of the training apparatus group. The results obtained $$\sum_{i=1}^{N_4} T_{ji}^4 \cdot \delta_i^4$$

at training layer 3 are supplied to the host computer connection 14) which multiplies these results by:
$f_1[f^{-1}(V_j^3)]$, respectively.
These products constitute the $\delta_i^3$ which are introduced at the input of processor $13_5$. Finally, this processor calculates:

$$\sum_{i=1}^{N_3} T_{ji}^3 \cdot \delta_i^3$$

which result is supplied to the host computer 10 which determines the $\delta_i^2$.

When there are more processing layers than in the present limited example, the operations are performed in this manner for all layers.

The host computer 10 thus determines the increments $$\Delta_i^{k+1} = \eta \cdot \delta_i^{k+1} \text{ and } D_j^k = \eta \cdot V_j^k$$

which are introduced into the processors of the first resolving apparatus group 11 so that:
processor $13_1$ receives $\Delta_i^2$
processor $13_2$ receives $\Delta_i^3$
processor $13_3$ receives $\Delta_i^4$
and of the training apparatus group 12 so that
processor $13_4$ receives $D_j^3$
processor $13_5$ receives $D_j^2$
in order to update the synaptic coefficients $C_{ij}^k$ and $T_{ji}^k$. Such updating is performed in parallel on j in the first resolving group which perform the resolving process iterations and takes place in parallel on i in the training group which perform the back-propagation iterations, This parallelism rests on the concurrent availability of the neuron states $V_j^k$ per layer and of the error states $\delta_i^k$ per layer.

FIG. 2A illustrates the processing of the data in the resolving apparatus. FIG. 2b illustrates the data processing in the training apparatus.

FIG. 2A shows a part of the calculation performed between layer 2 and layer 3 in processor $13_2$ in order to determine the state of the output neuron i=3 of the layer k=3. The synaptic coefficients of the layer 2 are $C_{31}^2$, $C_{32}^2$, $C_{33}^2$, $C_{C34}^2$ and the calculation performed is $$\sum_{j=1}^{4} C_{3j}^2 \cdot V_j^2.$$

This calculation is performed in the same way for all neurons of all layers, proceeding from the layer k=1 to the layer k=4.

The same Figure also shows the increment $\Delta_3^3 = \eta \cdot \delta_{33}$ which serves for the simultaneous updating of the synaptic coefficients $C_{3j}^2$.

FIG. 2B shows a part of the calculation for the error back-propagation algorithm which proceeds from the layer k=4 to the layer k=3 in the processor $13_4$. The errors $\delta_1^4$, $\delta_2^4$, $\delta_3^4$ are multiplied by the synaptic coefficients $T_{21}^3$, $T_{22}^3$, $T_{23}^3$, respectively, in order to supply the following result for the neuron j=2:

$$\sum_{i=1}^{3} T_{2i}^3 \cdot \delta_i^4$$

This calculation is performed in the same way for all neurons of all layers with the exception of the layer k=1 whose result is inoperative for the final result. The same Figure also shows the increment $D_2^3 = \eta \cdot V_2^3$ which serves for the simultaneous updating of the synaptic coefficients $T_{2i}^3$.

Figure 3:
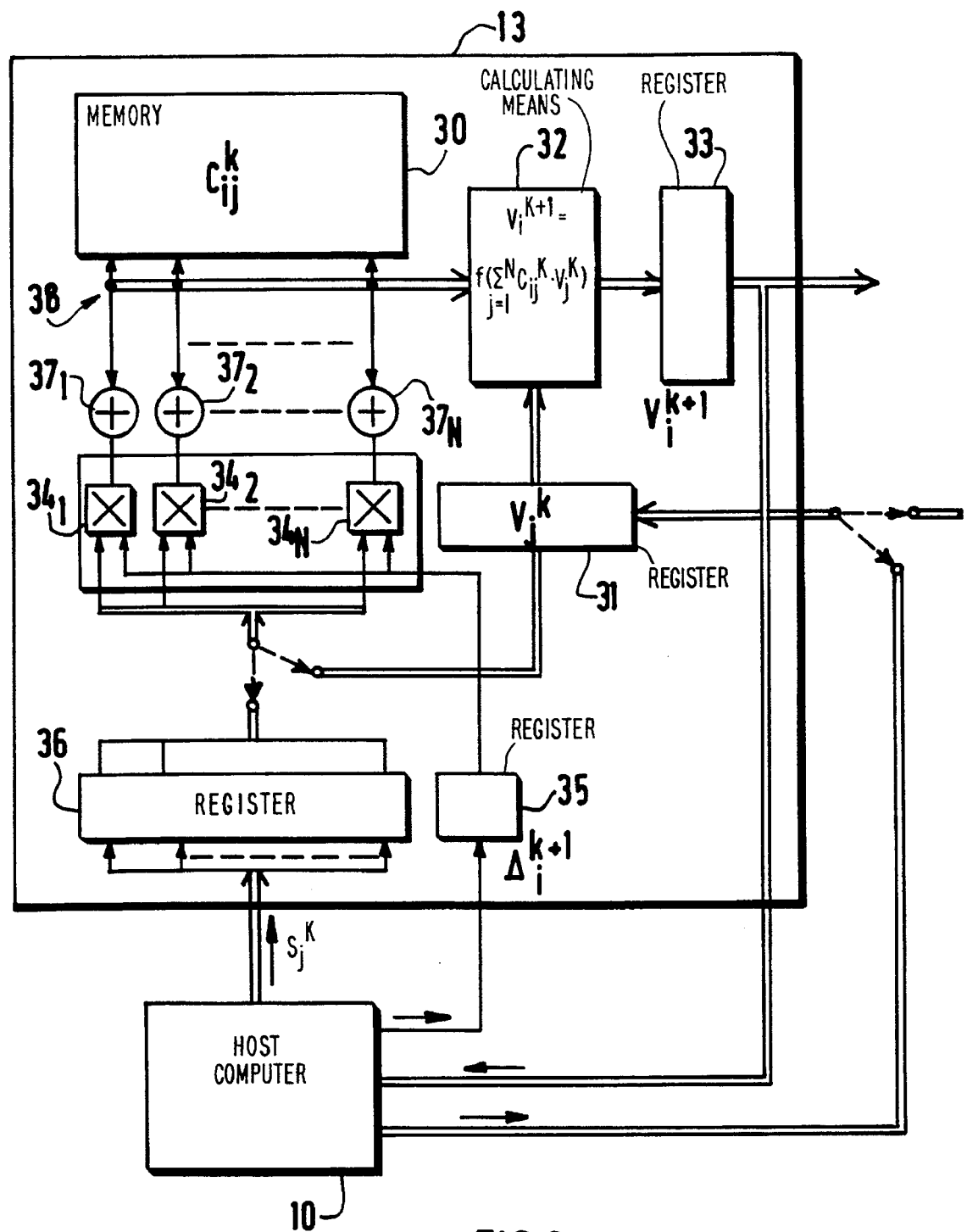
FIG. 3 shows a diagram of an exemplary processor for the neural network device in accordance with the invention.

FIG. 3 shows a processor for performing the resolving step as well as the training step, including the determination and the updating of the synaptic coefficients. A memory 30 stores the current synaptic coefficients. A state register 31 receives the states $V_j^k$ of the input neurons j either from the host computer 10 or from the environment for example. A calculating unit 32 receives the synaptic coefficients $C_{ij}$ (bus 38) and the states $V_j$ and performs the calculations $\Sigma C_{ij} \cdot V_j$. The calculation unit may also be capable of applying a non-linear function to the preceding sum. The results constitute the new states of the neurons i and are stored in the register 33. In accordance with the invention there are provided multipliers $34_1 \ldots 34_N$ (where $N = N_k$) which multiply an increment $\Delta_i^{k+1}$, which may be stored in a register 35, by a vector $S_j$ which may either be stored in a register 36 when it originates from the external processing device or may be formed by the states $V_j$ from the register 31. The result of each multiplication is used to update the synaptic coefficients $C_{ij}$ by means of adders $37_1, \ldots 37_N$ which are connected to the memory 30 via a bidirectional bus 38. The register 36 is omitted when the data $S_j$ is formed by the vectors $V_j$ stored in the register 31. The register 36 is used when the data $S_j$ originates for example from the host computer. The processing apparatus 11 and 12 of FIG. 1 utilise a plurality of processors 13 described above, but the data processed therein is different. In the resolving apparatus 11 the registers 35 receive the increments $\Delta_i$ which are multiplied by the neuron states originating either from the register 36 or directly from the register 31. In the training apparatus 12 the registers 35 receive the increment $D_j$ which are multiplied by the errors $\delta_i$ stored in the register 36 of each processor 13.

The updating process thus comprises:

N calculation operators which determine the products $\Delta_i \cdot V_j$ (or $D_j \cdot \delta_i$), N adders which calculate the new synaptic coefficients which are updated and then transferred to the memory by means of a bidirectional bus.

The resolving steps can be performed using a different parallel operation. In these cases the memory 30 is addressable as regards rows as well as regards columns. Thus, the determination of the state of each output neuron i on the basis of the states of input neurons j can be performed by performing a local processing operation in parallel on all input neurons j whose synapses converge towards the output neuron i.

The determination of the state of each output neuron i on the basis of the states of the input neurons j can be likewise performed by performing a processing operation in parallel on all output neurons i whose synapses depart from the input neuron j.

The determination of the state of each output neuron i on the basis of the states of the input neurons j can be likewise performed by performing a local processing operation in parallel on all input neurons j whose synapses converge towards the output neuron i and on all output neurons i whose synapses depart from the input neuron j.

Analogous parallelism can be realised in the training apparatus.

To this end, the determination of each output error $\delta_i$ on the basis of the input errors $\delta_j$ can be performed by executing a local processing operation in parallel on all neurons containing the input errors $\delta_j$ whose synapses converge towards the neuron containing the output error $\delta_i$.

The determination of each output error $\delta_i$ on the basis of the input errors $\delta_j$ can be likewise performed by executing a processing operation in parallel on all neurons containing the output errors $\delta_i$ whose synapses depart from the neuron containing the input error $\delta_j$.

The determination of each output error $\delta_i$ on the basis of the input errors $\delta_j$ can be performed by executing a local processing operation in parallel on all neurons containing the input errors $\delta_j$ whose synapses converge towards the neuron containing the output error $\delta_i$ and on all neurons containing the output errors $\delta_i$ whose synapsis depart from the neuron containing the input error $\delta_j$.

I claim:

1. A neural network device for receiving a signal representing an ambiguous external stimulus, and performing artificial recognition, learning and updating by reiteratively comparing the signal to a signal representing an unambiguous stimulus comprising:

a) feedforward resolving means comprising an input for receiving the comparative and external stimulus signals and a first plurality of processors (1, . . . , N) arranged in a layered architecture of K successive layers, for determining neuron output states $V_j^k$ for each successive layer, each processor comprising:
   i) first data input means connected to the input of the resolving means for receiving input data;
   ii) data output means for supplying output data; each processor $N_k$ having its first data input means coupled to the data output means of a preceding processing layer $N_{K-1}$,
   iii) a read/write coefficient memory for storing a group of values of synaptic coefficients for weighting input data received at the first data input means;
   iv) calculating means coupled to the coefficient memory and the first data input means for weighting the input data by the synaptic coefficients and for linearly combining the weighted input data for generating the output data;
   v) second data input means for providing coefficient matrix update data;
   vi) multiplier means having
      A) first multiplier input means coupled to the first data input means for receiving the input data,
      B) second multiplier input means coupled to the second data input means, and
      C) multiplier output means for supplying updates, the multiplier means multiplying in parallel the input data by the input received at the second multiplier input;
   vii) memory control means coupled between the coefficient memory and the multiplier means for generating respective sums by adding respective ones of the updates to respective ones of the values of the synaptic coefficients and also including means for replacing the values in the coefficient memory by the sums;

b) a central processing device having a main input coupled to the output of the last processor (N) for, upon detection of a discrepancy between desired output and device generated output data, supplying at the main output of the central processing device an error signal representative of the discrepancy;

c) an error back-propagation means comprising a second plurality of further processors (1, . . . , N-1) arranged in a layered architecture of successively descending layers, each successive further processor comprising:
   i) first error input means connected to the central processing device output for receiving the error signal;
   ii) error output means for supplying output error data to the next successive processor;
   the first further processor having its first error input means coupled to the main output of the central processing device and to a next further processor, each next further processor having its first error input means coupled to the error output of a preceding further processor, each further processor also comprising:
   iii) a further coefficient memory for storing a transpose matrix of synaptic coefficients for weighting component input error data received at the first error input means;
   iv) further calculating means coupled to the further coefficient memory and the first error input means for weighting the input error components by the synaptic coefficients of the transpose matrix and for linearly combining the weighted input error components for generating the output error data;
   v) second error input means for receiving transpose matrix coefficient updating;
   vi) further multiplier means including
      A) first multiplier input means coupled to the first error input means for receiving the input error components,
      B) second multiplier input means coupled to the second error input means, and
      C) multiplier output means for supplying further transpose matrix updates,
   the further multiplier means multiplying in parallel the input error components by input received at the second multiplier input means;
   vii) further memory control means coupled between the further coefficient memory and the further multiplier means for generating respective further sums by adding respective ones of the further updates to respective ones of the values of the synaptic coefficients and replacing the values in the further coefficient memory by the further sums; at least one of the second data input means in the resolving means being coupled to receive a value supplied at one of the error output means in the backpropagation means; and at least one of the second error input means in the backpropagation means being coupled to receive a value produced at one of the data output means in the resolving means.

2. The neural network of claim 1 wherein:
the memory control means in each processing means comprises an adder arrangement for generating the sums in parallel and for replacing in parallel the values in the coefficient memory by the sums; and
the further memory control means in each further processing means comprises a further adder arrangement for generating the further sums in parallel and for replacing in parallel the values in the further coefficient memory by the further sums.

3. The neural network of claim 2 wherein the processing means and the further processing means are all substantially identical.

4. The neural network of claim 1 wherein:
each processing means comprises a data register, coupled between the first data input and the first multiplier input, for storing the input data components; and
each further processing means comprises an error register, coupled between the first error input and the first multiplier input, for storing the input error components.

5. The neural network of claim 4 wherein the processing means and the further processing means are all substantially identical.

6. The neural network of claim 1 wherein:
each processing means comprises an additional register, coupled between the second data input and the second multiplier input, for storing a particular output error component supplied by a related one of the further processing means of the backpropagation path; and
each further processing means comprises a further additional register, coupled between the second error input and the second multiplier input, for storing a particular output data component supplied by an associated one of the processing means of the resolving path.

7. The neural network of claim 6 wherein the processing means and the further processing means are all substantially identical.

8. The neural network of claim 1 wherein:

in each processing means the calculation means performs the weighting of the input data components in parallel, the multiplier arrangement being a functional part of the calculation means; and in each further processing means the further calculation means performs the weighting of the input error components in parallel, the further multiplier arrangement being a functional part of the further calculation means.

9. The neural network of claim 8 wherein the processing means and the further processing means are all substantially identical.

10. The neural network of claim 1 wherein the processing means and the further processing means are all substantially identical.

11. The network of claim 1 in which in each processing means the synaptic coefficients stored in the coefficient memory form a matrix of coefficients and in each further processing means the synaptic coefficients stored in the coefficient memory form a transpose of one of the matrices.

12. The network of claim 1 in which each of the processors and the further processors comprise vector processors for updating the synaptic coefficients of the $C_{ij}$ matrices and the $T_{ji}$ matrices in the resolving phase and the training phase, respectively, and the input data, the output data, the input error data, and the output error data are all in the form of vectors with components supplied in parallel.

13. The neural network device of claim 1 in which each of the first and second plurality of processors comprises memory control means, the memory control means further comprising an adder arrangement for generating the sums in parallel and for replacing in parallel the values in the coefficient memory by the sums.

14. The neural network device of claim 1 in which each of the first plurality of processors further comprises a respective data register, coupled between the first data input and the first multiplier input, for storing the input data components.

15. The neural network device of claim 1 in which each of the first plurality of processors further comprises an additional register, coupled between the second data input and the second multiplier input, for storing vector state data which originates from an external processing device.

16. The neural network of claim 1 in which the calculating means comprises means for performing the weighting of the input data components in parallel, and, the multiplier arrangement is a part of the calculating means.

17. A processor for reiteratively receiving, processing and outputting data related to signal components representing an ambiguous external stimulus and for performing artificial recognition, learning and updating by repetitively comparing the signal components no signal components representing an unambiguous stimulus comprising:

i) first data input means for receiving input data;

ii) data output means for supplying output data;

iii) a read/write coefficient memory for storing a group of values of synaptic coefficients for weighting input data received at the first data input;

iv) calculation means for weighting the input data by the synaptic matrix coefficients and for linearly combining the weighted input data components for generating the output data;

v) second data input means for receiving matrix coefficient update data;

vi) multiplier means including
   A) first multiplier input means coupled to the first data input means for receiving the input data components,
   B) second multiplier input means coupled to the second data input means, and
   C) multiplier output means for supplying updates, the multiplier means multiplying in parallel the input data components by data received at the second multiplier input; and vii) memory control means coupled between the coefficient memory and the multiplier means for generating respective sums by adding respective ones of the updates to respective ones of the values of the synaptic coefficients and replacing the values in the coefficient memory by the sums.

18. The processor device of claim 17 wherein the memory control means comprises an adder arrangement for generating the sums in parallel and for replacing in parallel the values in the coefficient memory by the sums.

19. The processor device of claim 17 comprising a respective data register, coupled between the first data input and the first multiplier input, for storing the input data components.

20. The processor of claim 17 comprising an additional register, coupled between the second data input and the second multiplier input, for storing vector state data which originates from an external processing device.

21. The processor of claim 17 wherein the calculation means performs the weighting of the input data components in parallel, the multiplier arrangement being a functional part of the calculation means.

* * * * *